United States Patent [19]

Wiesner, III et al.

[11] Patent Number: 5,058,252

[45] Date of Patent: * Oct. 22, 1991

[54] APPARATUS AND METHOD FOR FINISHING CHAIN ASSEMBLY

[76] Inventors: Albert F. Wiesner, III, 424 Sherman Farm Rd., Harrisville, R.I. 02830; Philip Datseris, 79 Linden Dr., Kingston, R.I. 02881

[*] Notice: The portion of the term of this patent subsequent to Sep. 13, 2005 has been disclaimed.

[21] Appl. No.: 396,905

[22] Filed: Aug. 22, 1989

[51] Int. Cl.$^5$ ............................................. B23P 23/04
[52] U.S. Cl. .................................. 29/33 K; 29/33 R; 29/160.6; 29/428; 29/564.8; 59/16; 59/31; 229/192; 901/42
[58] Field of Search ..................... 29/33 K, 428, 160.6, 29/33 R, 564.8, 428; 59/12, 16, 31, 35.1, 93; 401/41, 42; 228/5.1, 13, 192

[56] References Cited

U.S. PATENT DOCUMENTS

| | | |
|---|---|---|
| 3,945,198 | 3/1976 | Linden et al. ............................ 59/16 |
| 3,977,180 | 8/1976 | Booth ........................................ 59/16 |
| 4,077,099 | 3/1978 | Cantini ................................ 29/160.6 |
| 4,141,211 | 2/1979 | Svensson et al. ....................... 59/16 |
| 4,163,142 | 7/1979 | Descovich et al. ................ 29/160.6 |
| 4,258,459 | 3/1981 | Cantini ................................ 29/160.6 |
| 4,298,154 | 11/1981 | DeFusco ............................. 29/160.6 |
| 4,769,884 | 9/1988 | Datseris et al. ..................... 29/33 K |

*Primary Examiner*—David Jones
*Attorney, Agent, or Firm*—Samuels, Gauthier & Stevens

[57] ABSTRACT

A method and apparatus for opening the bolt of a fastener, inserting an end cap D-ring, or quality tag. The method and apparatus comprises using a first clamp configured to receive therein a fasteners, a second clamp being configured to engage a latch or bolt of the fasteners, a robot gripper and control means to effect the opening of the fastener, the insertion of an end of a chain into the fastener and the closing of the fastener. The movement of the latch or bolt knob is coordinated with the movement of the fastener such that the forces acting on the bolt knob are substantially parallel to the direction of travel of the bolt in the fastener.

15 Claims, 7 Drawing Sheets

APPARATUS AND METHOD FOR FINISHING CHAIN ASSEMBLY

BACKGROUND AND SUMMARY OF THE INVENTION

This invention relates to an apparatus and method for assembling components of elongated jewelry articles such as chains.

In the assembly of such chains, the chain is initially cut to length and end caps or D-rings are secured to the ends by welding or soldering. Subsequently a spring ring is secured to one of the ends. The spring ring has a split bail which is opened and threaded through one end of the chain and then closed. Then the bolt of the spring ring is opened, the other end of the chain is inserted in the spring ring and the bolt is allowed to close to form a closed loop of chain. These steps are normally performed by hand.

In our issued U.S. Pat. No. 4,769,884, which is hereby incorporated by reference in its entirety in this disclosure, an apparatus for automatically assembling a jewelry chain is described in detail. One of the techniques in the assembly is the opening of a spring ring by actuating the bolt and the insertion of an end cap, D-ring or quality tag of the other end of the chain and the closing of the bolt. Although the techniques described in the patent accomplished the desired result, if the orientation of the spring ring was not correct, the movement of the bolt was not always effected easily.

The present invention is an improvement of the technique of opening the bolt of a fastener, inserting an end cap, D-ring, quality tag or the like through the opened fastener and then closing the bolt. In our prior invention the robotic gripper functioned, in combination with two clamps, to accomplish the insertion. In the present invention, the clamps are modified from those disclosed in the patent and a different sequence of steps is used to accomplish the same result.

Broadly our invention comprises a first clamp configured to receive therein a fastener, a second clamp being configured to engage the latch or bolt of the fastener, a robot gripper and means to control the movement of the clamps and the gripper to effect the opening of the fastener, the insertion of the other end of the chain into the fastener and the closing of the fastener. The movement of the latch or bolt knob is coordinated with the movement of the fastener such that the forces acting on the bolt knob are substantially parallel to the direction of travel of the bolt in the fastener.

Our invention comprises a first clamp having finger-like jaws, one of said jaws configured to receive therein a spring ring and including a surface against which the bail can abut; a second clamp having finger-like jaws, one of said jaws being configured to engage the bolt knob of a spring ring, a robot gripper and means to control the movement of the clamps and the gripper.

The spring ring is acquired by the robot gripper and transferred to one clamp. The robot gripper pushes the spring ring so the bail abuts against a surface. The other clamp engages the bolt knob and both clamps moving together effect the opening of the bolt. The robot gripper holding the other end of the chain moves the fastener, such as an end cap, through the opened spring ring. The clamps rotate to close the bolt and the chain is fastened.

DESCRIPTION OF THE PREFERRED EMBODIMENT

Figure 1:
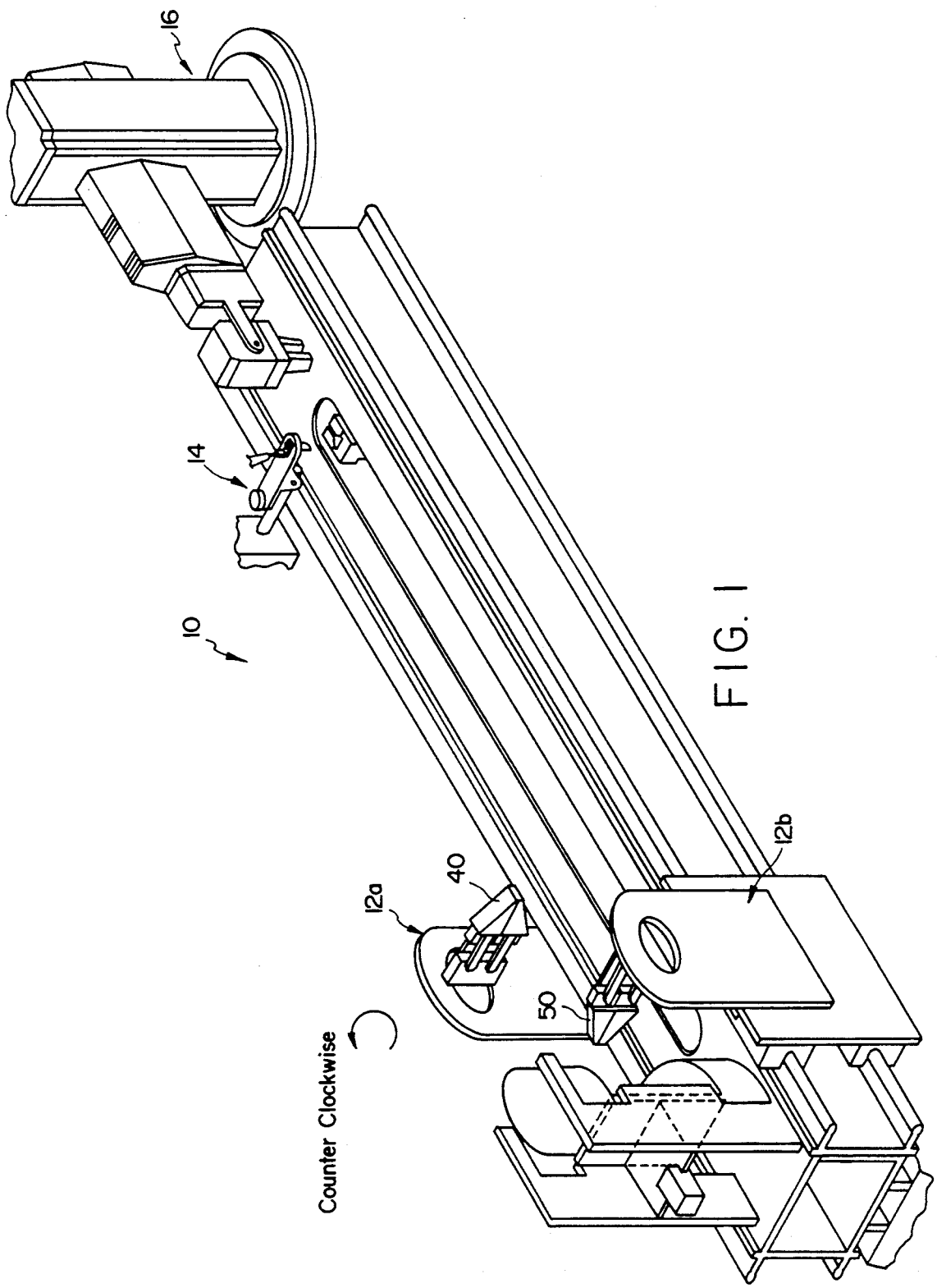
FIG. 1 is a perspective view of a system for assembling jewelry chains.

Referring to FIG. 1, the system is shown generally at 10 and includes clamp assemblies 12a and 12b, assembly station 14 and a robot 16. The robot is an MR-03 robot available from Micro Robotics of Chelmsford, Mass., which robot includes its own CPU for controlling the robot and control ports for controlling other components used in combination with the robot. The clamp assemblies used are those described in detail in U.S. Pat. No. 4,769,884 which patent is hereby incorporated by reference in its entirety in this disclosure. The cutting of the chain, the fastening of the end cap or the like to the chain, the acquisition of the spring ring, the fastening of the spring ring to the other end cap of the chain in a specific orientation are described in detail in the patent and are not repeated herein.

Figure 2:
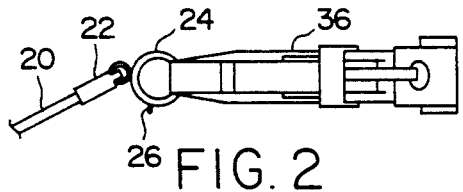
FIG. 2 is a top view of a robotic gripper engaging spring ring, end cap and chain.
Figure 3:
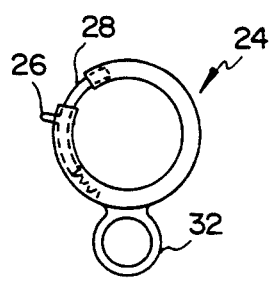
FIG. 3 is a top view of a spring ring.

Referring to FIG. 2, a jewelry chain 20, an end cap 22 and a spring ring 24 are shown. The spring ring 24 is held by a gripper 36 of the robot 16. The spring ring 24, FIG. 3, comprises bolt knob 26, bolt 28 and bail 32.

Figure 4:
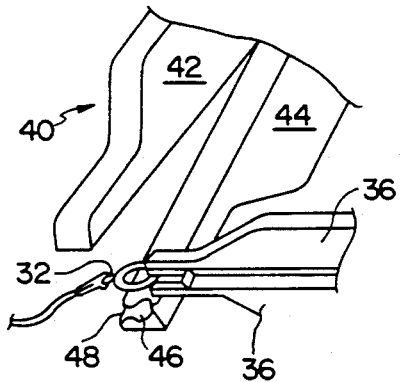
FIG. 4 is a perspective view of a clamp in combination with a robotic gripper.
Figure 5:
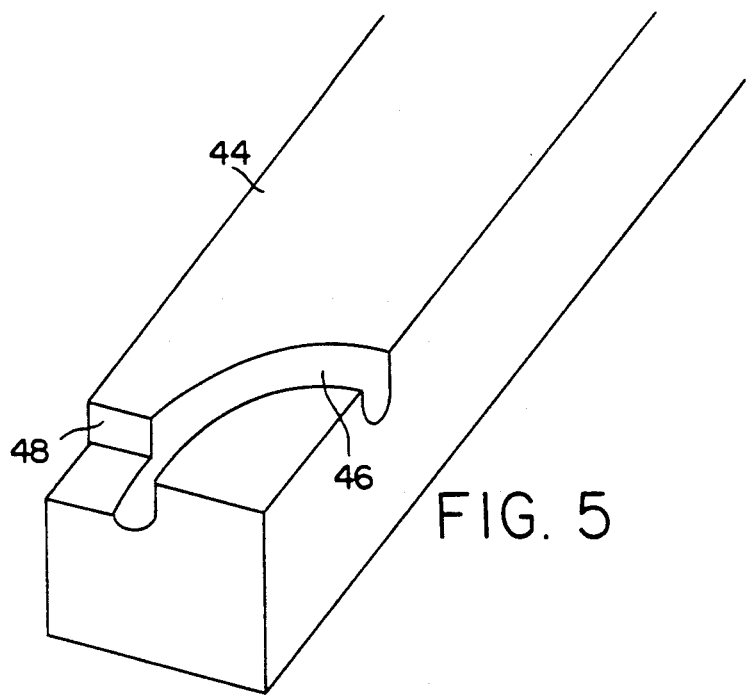
FIG. 5 is an enlarged view of FIG. 4.

Referring to FIGS. 4 and 5, the clamp 40 of the assembly 12a is shown and includes an upper jaw 42 and a lower jaw 44. The jaw 44 is characterized by a spring ring groove 46. A recess 48 is formed in the edge of the jaw 44. This recess 48 is a spring ring bail stop. In the assembly of the chain, the spring ring 24 is placed in the groove 46 with the spring ring bail abutting the spring ring bail stop 48.

Figure 6:
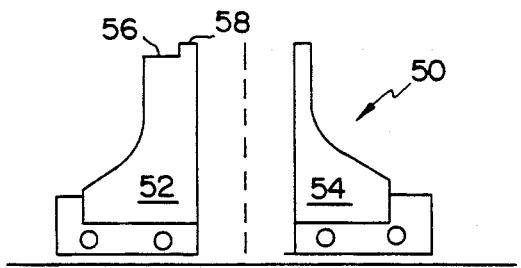
FIG. 6 is a top view of another clamp.
Figure 13B:
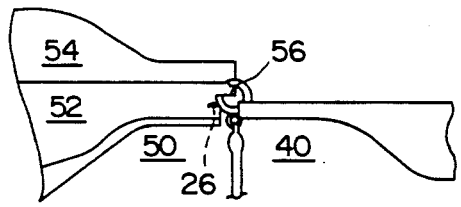

As shown in FIG. 6, the clamp 50 of the assembly 12b comprises two jaws 52 and 54. The jaw 52 includes a stepped portion 56 at its end, which defines a finger tab 56. This finger tab will push the spring ring bolt knob back to open the spring ring.

Figure 7:
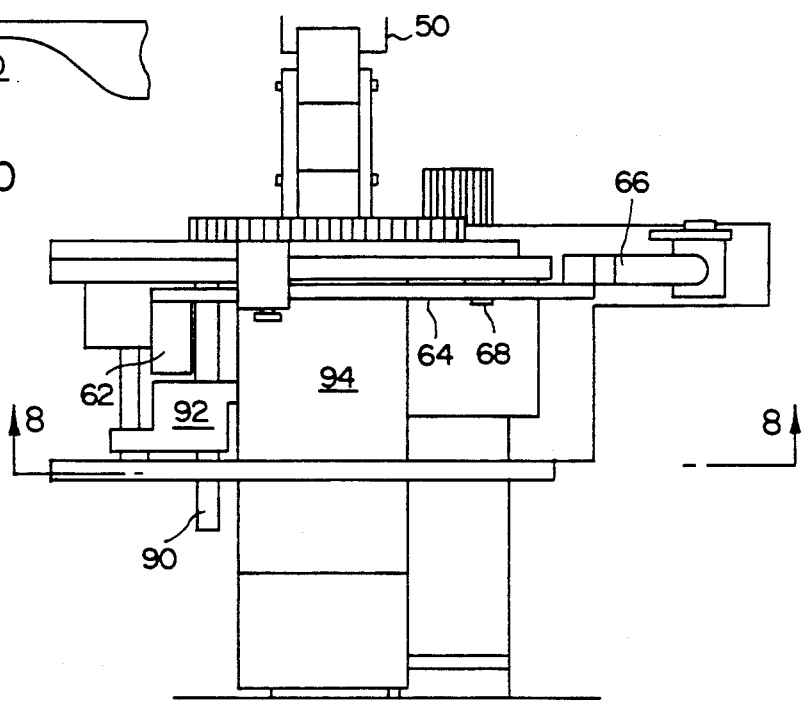
FIG. 7 is a top view of a modified clamp assembly.
Figure 14:
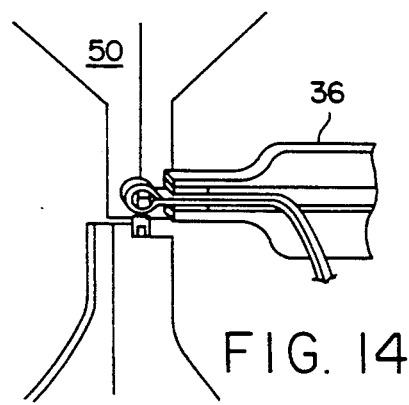

FIG. 7 is a plan view of the clamp assembly 12b which has been modified from the prior art clamp assembly to embody an extension interceptor system. This system's function is to control the extension of the clamp 50 during the step when the clamp 50 engages the bolt knob and drives open the bolt. The system comprises an interceptor 62, which is simply a block joined to one end of an interceptor arm 64. The other end of the arm 64 is joined to a pneumatic extension cylinder 66. The arm is pinned at 68.

Figure 8:
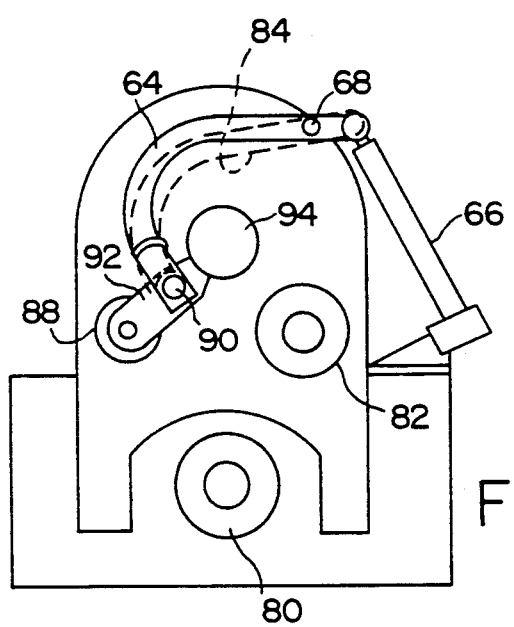
FIG. 8 is a sectional view of FIG. 7 taken along lines 8—8.

FIG. 8 illustrates the arm in the engaged (dotted lines) and disengaged positions.

Figure 9:
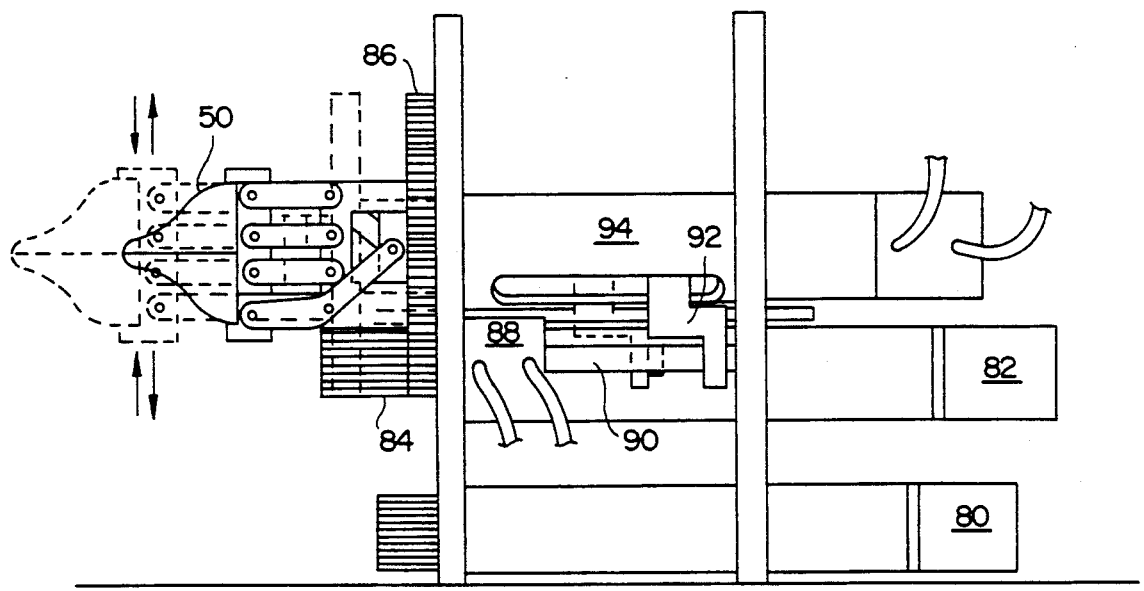
FIG. 9 is a side view of the clamp assembly of FIG. 7.

Referring to FIG. 9, a motor 80 is used to drive the clamp 50 along a longitudinal axis as described in the parent application. A motor 82 drives a pinion gear 84 which effects rotation of the clamp 50 by driving the rotation gear 86.

A double acting pneumatic cylinder 88 drives a shaft 90. A link 92 is joined to both the shaft 90 and a clamp shaft 94. The link 92 driving the shaft 94 effects the extension and retraction of the clamp 50.

When the interceptor system is actuated, the interceptor 62 moves next to the shaft 90 and ahead of the linkage 92. Thus, in this step when the clamp is actuated to move forward from a retracted to an extended position, it moves a known amount until the link member 92 engages the interceptor 62.

In the operation of the invention referring to FIGS. 2-6 and 10-14, the gripper 36 acquires the spring ring-chain 24-20 in a known orientation, FIG. 2. The spring ring is placed in the groove 46 of the jaw 44 with the bail 32 adjacent the bail stop 48, FIG. 4.

Figure 10:
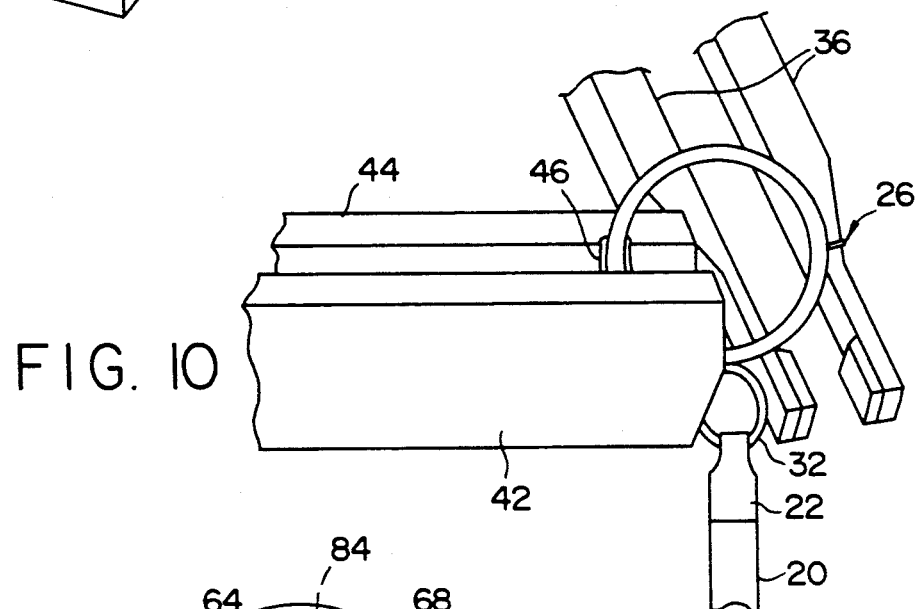

The jaws 42-44 close and the gripper 36 disengages from the spring ring. The clamp 40 rotates such that the spring ring 24 lies in a vertical plane, FIG. 10. After the robot gripper releases from the clamp 40, it contacts the spring ring bail, as shown in FIG. 10, while the spring ring is held by the clamp 40, to push the spring ring bail 32 against the spring ring bail stop 48. The groove 46 for the spring ring and the spring ring bail stop 48 are shown clearly in FIG. 5.

Figure 11:
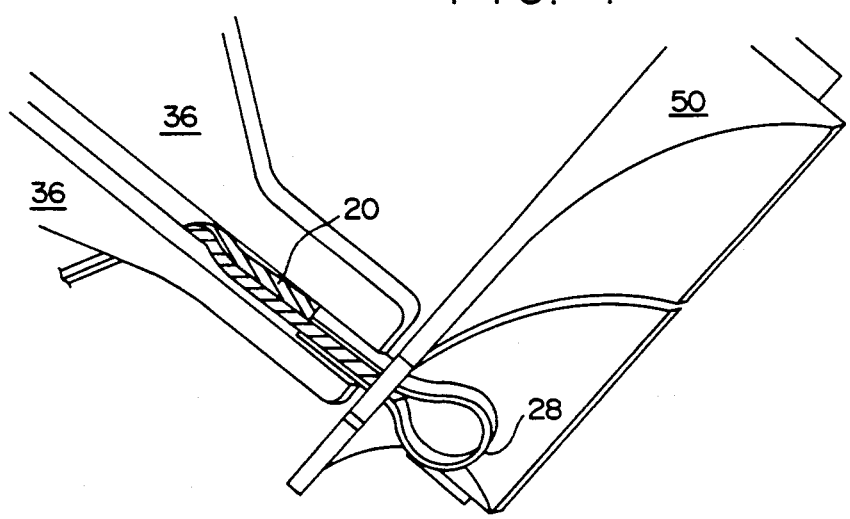
FIGS. 10, 11, 12a–12b, 13a–13b, and 14 are illustrations of some of the steps in the assembly process.
Figure 12A:
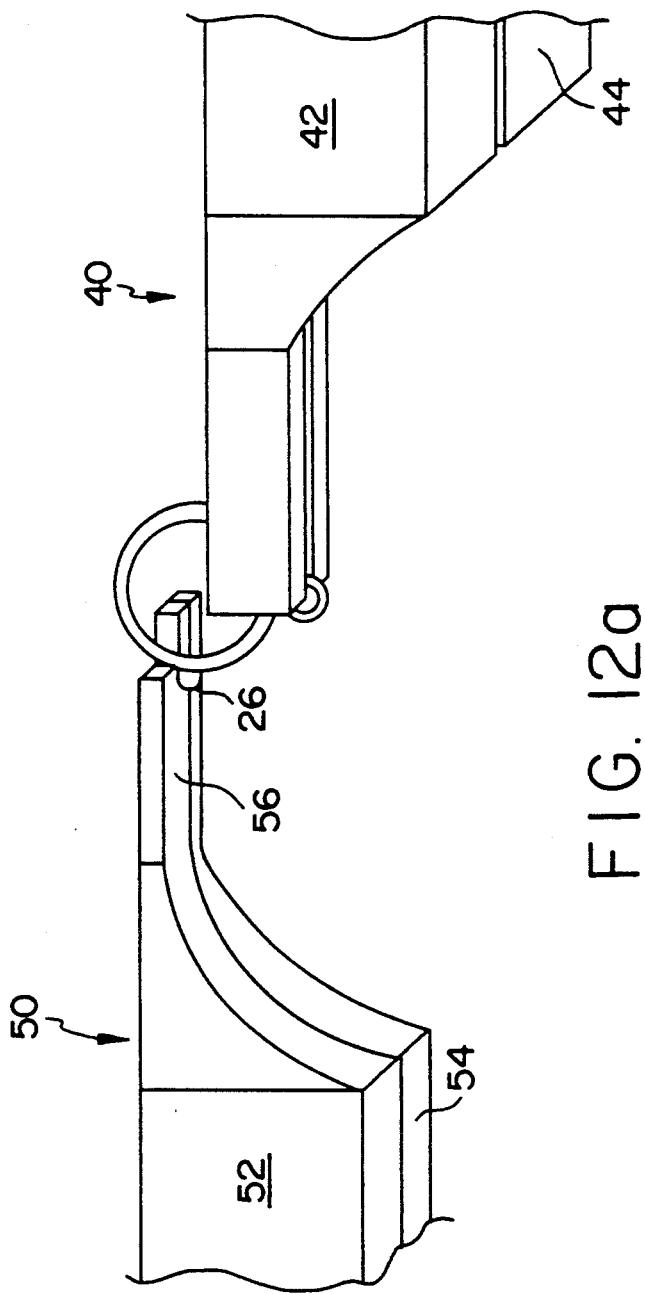

The robot gripper 36 moves to the clamp 50 to grasp the other end of the chain, FIG. 11. The clamp 50 opens to release the jewelry chain. The clamp 50 moves to the spring ring 24, while the clamp 40 rotates approximately 25 degrees counterclockwise (into the plane of the paper). The clamp 50 is rotated clockwise (out of the plane of the paper) to bring its finger tab 56 into contact with the spring ring bolt knob 26 and to obtain a parallel orientation between clamps 40 and 50. This alignment is shown in FIG. 12a. It is important to maintain parallelism between clamps to avoid deformation of the spring ring.

Figure 12B:
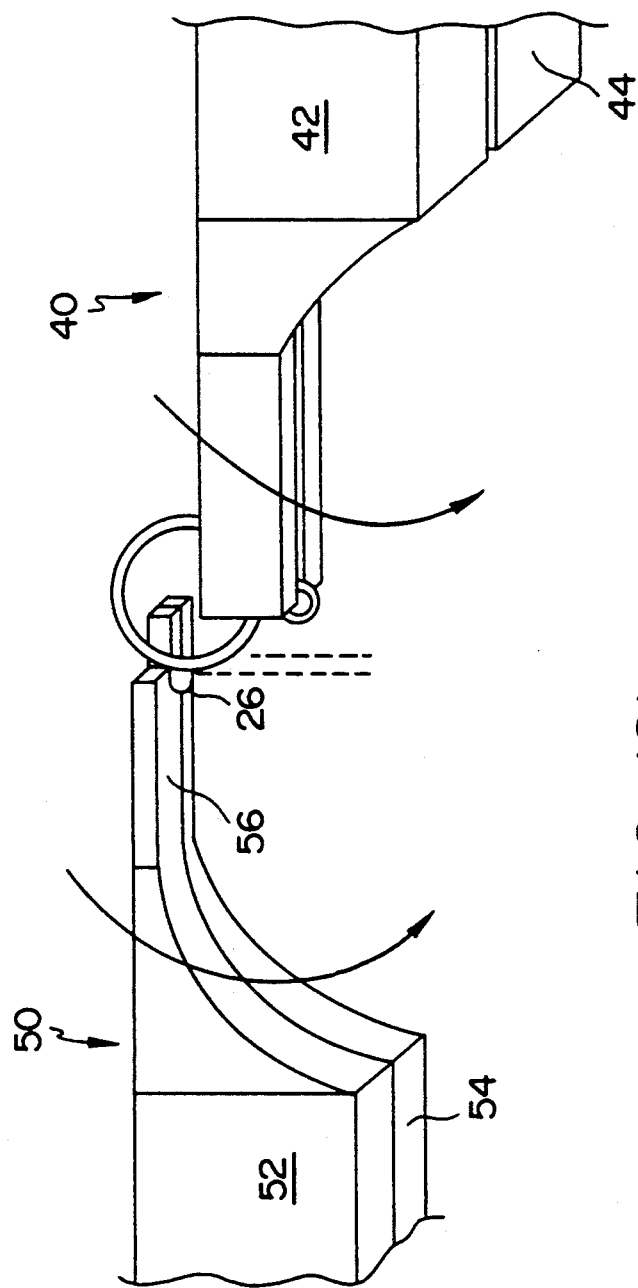
Figure 13A:
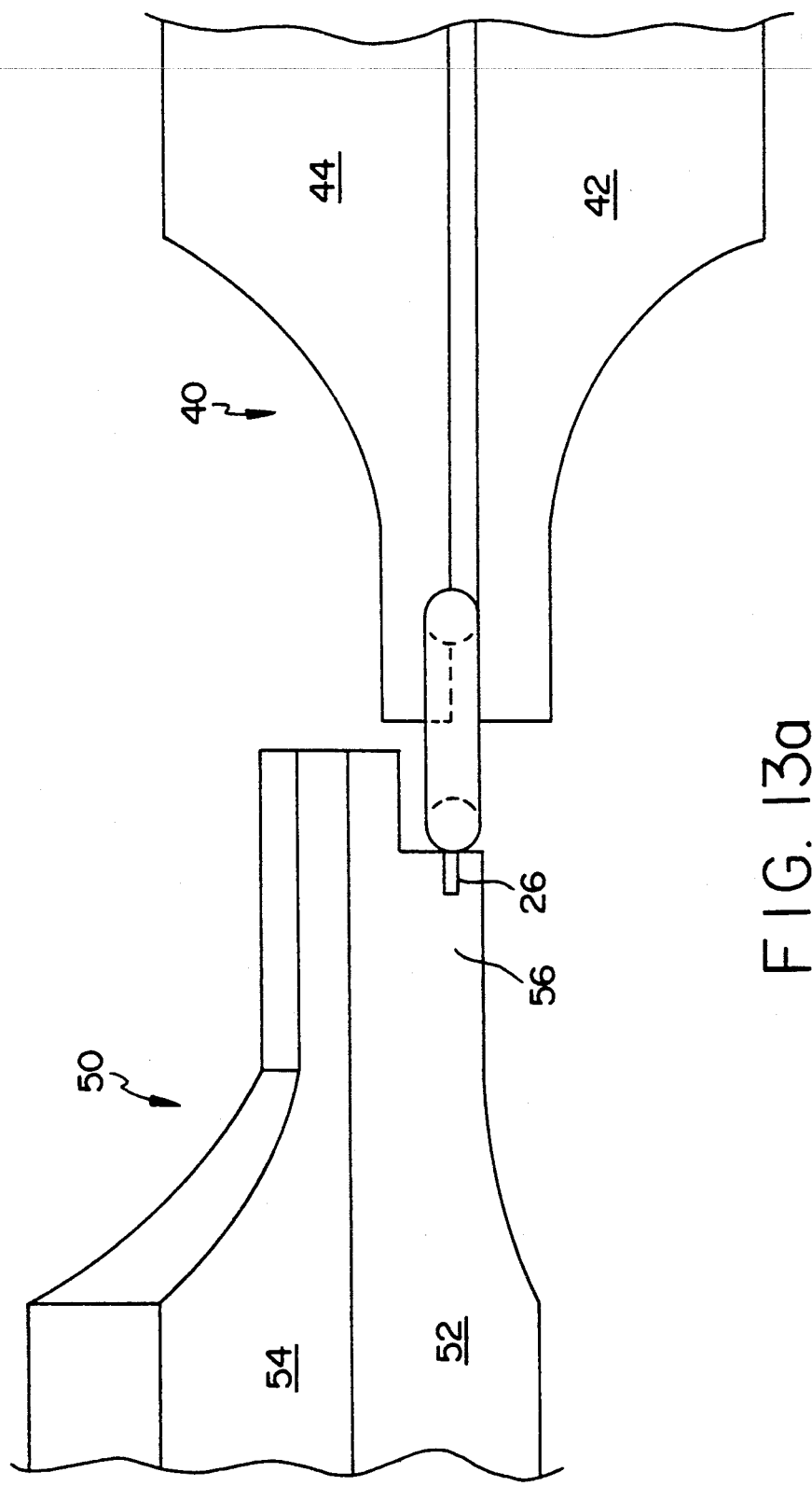

With the spring ring 24 held by the clamp 40 and the finger tab 56 of the jaw 52 now engaging the spring ring bolt knob 26, both clamps are rotated in a clockwise direction as indicated by the arrows, FIG. 12b. The clamp 50 rotates past the horizontal position by approximately 30° in order to retract the spring ring bolt knob in a position that results in a fully opened spring ring. At approximately midway through this process, the clamp 50 is extended (the interceptor system was previously activated) the distance shown by the dotted lines in FIG. 12b. This simultaneous rotation and extension of the clamp 50 causes the finger tab 56 to ride along the circumference of the spring ring, FIGS. 13a and 13b. That is, the forces acting on the bolt knob 26 are generally parallel to the movement of the bolt 28 in the spring ring 24.

The robot gripper 36 then moves to insert the end cap into the spring ring. After insertion, the clamp 50 rotates counterclockwise approximately 60° to allow the bolt to close the spring ring. The gripper 40 then opens to free the assembly and the robotic gripper transfers the assembled chain and deposits it on the finished product stack.

The robot used in the preferred embodiment of the invention is an MR-03 robot available from Microbotics Corporation. Control of the CPU of the robot is accomplished through instructions which are written in terms of the particular mode of operation desired. The computer thus has stored in its memory and disks the programs and routines corresponding to each mode of operation of the computer. It is well known to those skilled in the art that the computer comprises suitable control, storage and computational units for performing arithmetic and logical functions on data which it processes in digital form. Any standard computer language consistent with the capability of the computer can be used with the instructions.

The manufacturers handbook sets forth the necessary programs which include the sequence of internal interconnections which have been added by preparation and loading of the programs into the internal memory of the computer.

The robot used in the preferred embodiment has control boards to control eleven dc motors. Five of these boards are used to control the robot arm through its five degrees of freedom. Four of the boards are used to drive the motors in the clamp assemblies. The CPU includes ports to provide outputs to control fifteen pneumatic cylinders. Four of these are used for the clamp assemblies.

The general acquisition of an object, such as the spring ring and its movement from an acquisition site to a work site is known in the art. The handling consists of the programmed movement of the robot gripper and the clamps. More specifically, during set up, the robot gripper and clamps are moved via a keyboard controlled by an operator to accomplish the steps described above. This is done for each task (acquisition, movement and release) the robot will perform during assembly. Subsequently, the tasks are performed automatically. Thus, the specific transfer of the fasteners and their manipulation is well within the skill of the art.

Although described with reference to a spring ring, the invention is equally applicable to other fasteners having biased latches or bolts such as lobster claws, etc.

The apparatus described herein can be used in any orientation. It has been found, however, that the invention is best suited when operated in an orientation such that the end of the chain which is being acted upon is hanging vertically. It has been found that the apparatus described in our previous patent functioned suitably for chains such as herring bone and the like where the chain end extending beyond the edge of the gripper and/or clamp had some dimensional stability. However, operating in a vertical mode is satisfactory for all chains and especially satisfactory for link chains and the like.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. In an apparatus for securing fasteners to the ends of a chain or strand which has first and second clamps each adapted to move through at least three degrees of freedom, two in translation and one in rotation and a robot gripper adapted to function in cooperation with the clamps and wherein a fastener is held in one clamp and the bolt knob of the fastener is opened by the other clamp, the improvement which comprises:

means to move the first and second clamps through the three degrees of freedom to move the bolt knob, the forces acting on the knob being substantially parallel to the direction of travel of the bolt in the fastener to open the bolt; and means to control the means to move the clamps in communication with said means to move.

2. The apparatus of claim 1 wherein the means to control the clamps includes means to control the clamps such that their axes of rotation are parallel.

3. The apparatus of claim 1 wherein the means to control the clamps includes means to control the rotation of both clamps to effect opening of the bolt.

4. The apparatus of claim 3 wherein the means to control the clamps includes means to rotate one clamp through a greater arc than the other clamp.

5. The apparatus of claim 4 wherein the means to rotate includes means to translate one clamp during rotation.

6. The apparatus of claim 5 wherein the first clamp holds the fastener and the second clamp engages the bolt knob.

7. The apparatus of claim 6 wherein the means to move the second clamp comprises an interceptor system which system includes means to rotate and translate the second clamp.

8. The apparatus of claim 7 wherein the interceptor system includes:

means to translate the second clamp during rotation.

9. The apparatus of claims 6 or 7 wherein the fastener is a spring ring and the first clamp comprises:

two jaws, one of said jaws characterized by a spring ring groove and a recess defined in the edge of the jaw to define a spring ring bolt stop.

10. The apparatus of claims 6 or 8 wherein the means to control includes means to move the robot gripper to insert a fastener secured to the other end of the chain into the opened spring ring.

11. The apparatus of claims 6 or 8 wherein the means to control includes means to counter-rotate of one of said clamps to effect the closing of the fastener.

12. The apparatus of claim 11 wherein the clamp to effect the closing is the second clamp.

13. In an apparatus for securing fasteners to the ends of a chain or strand which has first and second clamps each adapted to move through at least three degrees of freedom, two in translation and one in rotation and a robot gripper adapted to function in cooperation with the clamps and wherein a fastener is held in one clamp and a bolt knob of the fastener is opened by the other clamp, the improvement which comprises:

means to control the rotation of the first and second clamps to move the bolt knob, the forces acting on the knob being substantially parallel to the direction of travel of the bolt in the fastener to open the bolt wherein one clamp moves through a greater arc than the other clamp and one clamp moves in translation during rotation; and wherein one of said clamps includes two jaws, one of said jaws characterized by a spring ring groove and a recess defined in the edge of the jaw to define a spring ring bolt stop.

14. The apparatus of claim 13 wherein the second clamp comprises two jaws, one of said jaws terminating in a finger.

15. The apparatus of claim 13 wherein the second clamp is controlled by an interceptor system which includes means to rotate the second clamp through a greater arc than the first clamp.

* * * * *